United States Patent
Azzouz et al.

(10) Patent No.: US 8,834,240 B2
(45) Date of Patent: Sep. 16, 2014

(54) FAN HAVING ADJUSTMENT OF THE ORIENTATION AND FLOW RATE OF AN AIR FLOW

(75) Inventors: Loys Azzouz, Cormeilles-en-Parisis (FR); Tony Ercolano, Wavignies (FR); Pierre Guerreiro, Saint Gratien (FR)

(73) Assignee: Faurecia Interieur Industrie, Nanterre (FR)

( * ) Notice: Subject to any disclaimer, the term of this patent is extended or adjusted under 35 U.S.C. 154(b) by 1406 days.

(21) Appl. No.: 12/518,341

(22) PCT Filed: Dec. 10, 2007

(86) PCT No.: PCT/FR2007/002032
§ 371 (c)(1),
(2), (4) Date: Jun. 9, 2009

(87) PCT Pub. No.: WO2008/084148
PCT Pub. Date: Jul. 17, 2008

(65) Prior Publication Data
US 2010/0014959 A1    Jan. 21, 2010

(30) Foreign Application Priority Data

Dec. 11, 2006 (FR) .................... 06 10773

(51) Int. Cl.
*B60H 1/34* (2006.01)

(52) U.S. Cl.
CPC ...... *B60H 1/3435* (2013.01); *B60H 2001/3471* (2013.01)
USPC .............. 454/154; 454/152; 454/70; 454/143

(58) Field of Classification Search
CPC ...... B60H 1/34; B60H 1/3414; B60H 1/3435; B60H 1/3442; F24F 13/065; F24F 13/12
USPC .............. 454/73, 155, 71, 103, 108–109, 152, 454/154, 264–265, 286, 305, 323–324
See application file for complete search history.

(56) References Cited

U.S. PATENT DOCUMENTS

| | | | |
|---|---|---|---|
| 3,802,328 A * | 4/1974 | Kakizaki | 454/154 |
| 4,006,673 A * | 2/1977 | Meyer et al. | 454/154 |
| 4,377,107 A * | 3/1983 | Izumi | 454/316 |
| 5,127,876 A * | 7/1992 | Howe et al. | 454/76 |
| 7,093,821 B2 * | 8/2006 | Howe | 251/218 |
| 2009/0047892 A1* | 2/2009 | Brancheriau et al. | 454/162 |

FOREIGN PATENT DOCUMENTS

| | | | |
|---|---|---|---|
| FR | 2 784 624 | 4/2000 | |
| FR | 0505323 | * 5/2005 | ............ F24F 13/065 |
| FR | 2 886 384 | 12/2006 | |
| FR | 2 886 385 | 12/2006 | |

OTHER PUBLICATIONS

International Search Report dated Jun. 19, 2008, from corresponding PCT application.

* cited by examiner

*Primary Examiner* — Steven B McAllister
*Assistant Examiner* — Ko-Wei Lin
(74) *Attorney, Agent, or Firm* — Young & Thompson

(57) ABSTRACT

An aerator includes a duct (50) defining a chamber in which a portion of the inner surface defines a spherical segment, a profiled body (60) with a holding device (62), and a ring (52) having an outer surface defining a portion of a sphere having the same radius as the spherical segment of the chamber and bearing the profiled body (60) in the duct (50) while allowing the rotational movement thereof relative to the duct (50) and the translation movement thereof relative to the find (22), wherein the profiled body (60) can assume a closing position when in contact with the duct. The profiled body (60) is provided with a member (70) for limiting the translation stroke when the translation axis of the body (60) is very inclined. Application in automotive vehicles.

16 Claims, 2 Drawing Sheets

FAN HAVING ADJUSTMENT OF THE ORIENTATION AND FLOW RATE OF AN AIR FLOW

The present invention relates to an aerator or air vent having adjustment of the orientation and flow rate, for example, of the type used inside cars, in particular in a dashboard.

BACKGROUND OF THE INVENTION

Document FR-2 886 384 describes an air vent which has adjustment of the orientation and flow rate and which comprises an air flow conduit having a chamber which forms a spherical segment, a profile-member having dimensions which are substantially less than those of the chamber, and a ring whose outer surface forms a sphere portion having the same radius as the spherical segment of the chamber; the ring is provided with arms carrying the profile-member by means of cooperation with grooves of the profile-member, which grooves are orientated practically in the flow direction of the air flow. In this manner, the profile-member can be rotated relative to the chamber of the conduit owing to the ring sliding against the spherical segment. The profile-member can further be moved in translation relative to the ring without the ring being moved in relation to the chamber.

In one embodiment, it is indicated that the profile-member can be pushed towards the inlet of the conduit so that it forms a stopper of the conduit.

FIG. 1 illustrates such an air vent having a conduit 10 which delimits a spherical segment, in contact with which there is provided a ring 26 which has arms 28 having an end 31 which can slide in a longitudinal groove 30 which is formed in the profile-member 18. The profile-member 18 has a rear surface 22 which is near the inlet 12 of the conduit and which carries a lip 44 which may move into contact with a portion 46 of the conduit 10 which is remote from the outlet 14 and in the region of which the profile-member may be gripped by means of a projection 24 which forms a holding member.

It became apparent that, as indicated in FIG. 2, when the profile-member 18 is inclined relative to the flow direction of the air flow, it was not possible to obtain complete contact of the profile-member 18 with the inlet 12 of the conduit 10. Consequently, when the user pushes the profile-member inwards by means of the projection 24, when the member 18 arrives at the end of travel, the surface 22 moves into contact with one side of the conduit 10 whilst the opposite side leaves a substantial space for the flow of air. In practice, in such an inclined position, the user does not obtain zero flow.

So that the flow rate of the air vent is zero, it is necessary for the user to position the translation direction of the profile-member in alignment with the axis of flow of air or the axis of the air vent, but there is no indication at all to the user that he must carry out such an operation.

SUMMARY OF THE INVENTION

An object of the invention is to solve the problem posed by this absence of closure when the profile-member is in an inclined position. In a first embodiment, a travel limiting member prevents translation movement towards the closure position as long as the axis of the profile-member is not aligned with the axis of the air vent so that a user perceives this prevention and knows that he has not blocked the air vent. He can then attempt to turn the profile-member in order to align the two axes.

In a second embodiment, the travel limiting member is associated with a guiding member so that, when the user pushes the profile-member when he wishes to close the air vent, the profile-member is progressively moved into a position which is close to alignment of the two axes and in which the air-tight closure is brought about between the profile-member and the conduit.

In greater detail, the invention relates to an air vent having adjustment of the orientation and flow rate, of the type which comprises a conduit for the air flow having, between an inlet and an outlet delimiting a flow direction, at least one chamber, of which at least a portion of the inner surface forms a spherical segment, a profile-member, at least the majority of which is provided in the chamber of the conduit so that the flow of air moves in the chamber around the profile-member, the profile-member having a holding device which is provided at the side of the outlet, and a ring which has an outer surface forming a sphere portion having practically the same radius as the spherical segment of the chamber, with which it cooperates, the ring being provided in the chamber and supporting the profile-member in the conduit, allowing movement of the profile-member in rotation relative to the conduit and in translation relative to the ring along an axis of translation, the profile-member being able, in its translational movement relative to the ring, to take up a closure position, in which it is substantially in contact with the conduit and blocks it. According to the invention, the profile-member is provided with a travel limiting member which limits the travel of the profile-member in terms of translation relative to the ring when the axis of translation of the profile-member relative to the ring is substantially inclined relative to the flow direction.

Preferably, the profile-member has a circular portion which is centred relative to the axis of translation and which forms a surface for blocking the conduit.

Preferably, the ring has at least one arm which projects towards the inner side of the ring and which is intended to support the profile-member whilst allowing it to move in translation.

In a variant, the profile-member has at least one groove, in which a portion of the arm is intended to slide in a direction having at least one component in the translation direction.

In another variant, the profile-member has a cylindrical portion which slides in a collar which is fixedly joined to the arms of the ring.

Preferably, the ring has at least three arms.

Preferably, at least one sealing lip is provided on one of the elements selected from the conduit and the profile-member and is intended to move into contact with the other one of the elements selected from the conduit and the profile-member at the location at which the profile-member is practically in contact with the conduit.

In one embodiment, the travel limiting member comprises a plurality of projections, each having a cross-section of small width in a plane which is perpendicular relative to the axis of translation. For example, each projection is in the form of a fin which is contained in a plane which contains the axis of translation of the profile-member. Preferably, the projections are provided in contact with the profile-member inside the blocking surface.

In another embodiment, the travel limiting member further constitutes a guiding member which, owing to contact with the wall of the conduit, tends to bring about alignment of the axis of translation with the flow direction when the blocking surface moves towards the position for contact with the conduit. For example, the limiting and guiding member comprises a projection which tapers in accordance with the axis of translation and which is provided substantially at the centre of the blocking surface.

Preferably, the chamber and the profile-member are practically generated by revolution.

Preferably, the air vent further comprises a device for fixing the profile-member in position in the conduit.

BRIEF DESCRIPTION OF THE DRAWINGS

Other features and advantages of the invention will be better understood from a reading of the following description of embodiments with reference to the appended drawings, in which, with FIGS. 1 and 2 already having been described.

DETAILED DESCRIPTION OF THE PREFERRED EMBODIMENTS

Figure 3:
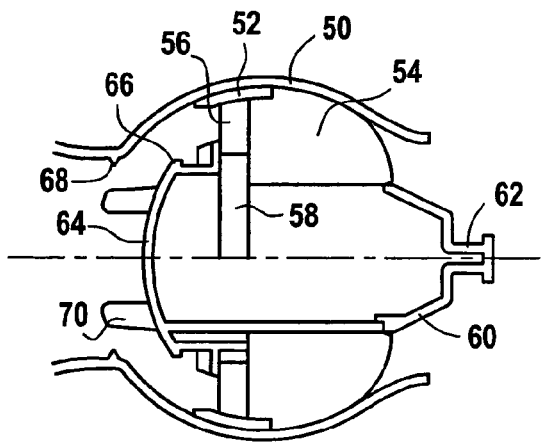
FIGS. 3 and 4 are sections through an air vent, with a profile-member being partially sectioned when the axes of the profile-member and the air vent are aligned and when they are not aligned, respectively, in one embodiment of a travel limiting member.
Figure 4:
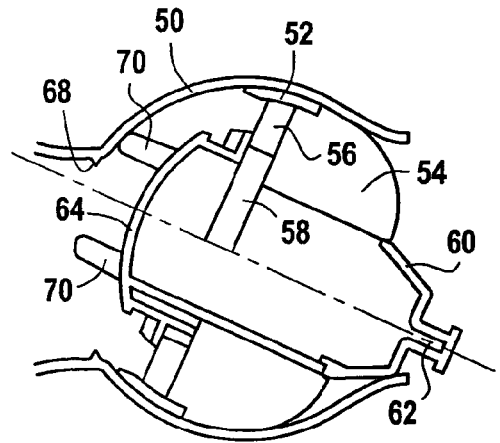

FIGS. 3 and 4 illustrate a first embodiment of an air vent according to the invention.

In those Figures, a fixed conduit 50 delimits a chamber in the form of a spherical segment, at the inner surface of which there can move a ring 52 which is associated with fins 54 which are orientated in the flow direction of the air flow. The ring 52 is provided with arms 56 which, in the embodiment in question, carry a collar 58, in which a profile-member 60 can slide. This member 60 can be gripped by a holding or projecting member 62 by the user of the air vent who wishes to adjust it.

At the opposite side to the projection 62, the profile-member 60 has a surface 64 for blocking the opening of the conduit, that surface having, at its periphery, a lip 66 which may cooperate with the interior of the conduit. In a variant, it is the interior of the conduit which has a lip 68.

As indicated in FIG. 3, when a pressure is applied to the projection 62 towards the inner side of the air vent, the profile-member 60 moves towards the inner side of the air vent, without any rotation of the ring 52, until the rear surface 64 of the air vent moves into contact with the conduit 50 by means of the lip 66 and/or 68 and brings about sealing closure of the air vent.

It will be appreciated in FIG. 3 that the profile-member 60 comprises a travel limiting member which prevents movement in translation and which is constituted by projections 70 in the form of fins which are orientated in the flow direction of the air flow. In the position of FIG. 3, those projections 70 do not serve any purpose. However, in the position of FIG. 4, that is to say, when the profile-member 60 has pivoted relative to the conduit 50 so that the air flow is directed obliquely relative to FIG. 4, at least one projection 70 is in contact with the inner side of the conduit 50 or is near such contact.

In this manner, if a user wishes to close the air vent and applies a pressure to the projection 62 so that the profile-member 60 is urged backwards, he cannot carry out that movement because the projection 70 is in contact with the conduit. Therefore, the user knows that he has not closed the air vent and, in order to bring about such closure, he attempts to move the profile-member 60 in order practically to align the translation axis of the profile-member with the axis of the air vent, that is to say that he moves the profile-member towards the orientation illustrated in FIG. 3.

Figure 5:
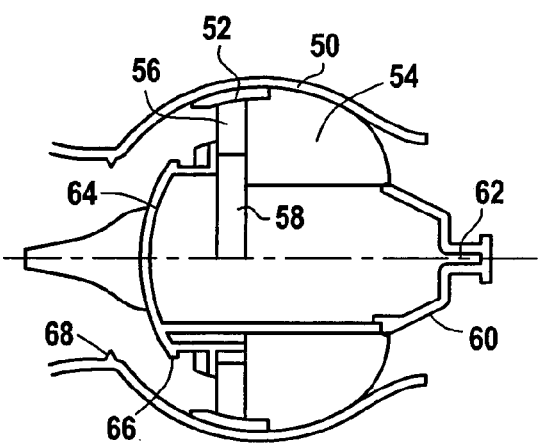
FIGS. 5 and 6 are similar to FIGS. 3 and 4, but depict an embodiment in which the travel limiting member also constitutes a member for guiding the profile-member according to the invention.
Figure 6:
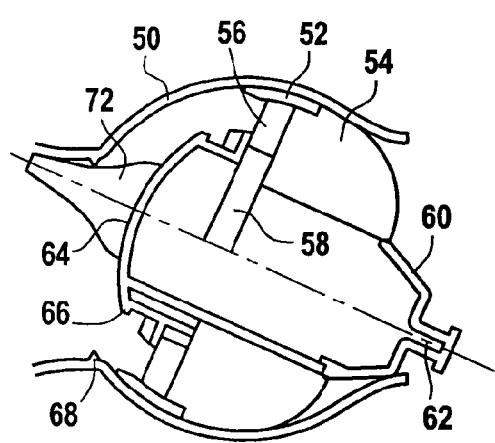

FIGS. 5 and 6 illustrate another embodiment, in which the projections 70 are replaced by a guiding member 72. The member is of a shape which tapers towards the rear, that is to say, at the opposite side to the profile-member, and the end thereof is still outside the chamber in which the ring 52 moves.

With the orientation of FIG. 5, the closure of the air vent is completely similar to that described with reference to FIG. 3. However, with the orientation of FIG. 6, when the user wishes to close the air vent and applies a pressure backwards to the projection 62, the limiting and guiding member 72 slides along the lip 68 or conduit, bringing about rotation of the profile-member 60 and the ring 52 towards an orientation which is similar to the alignment orientation as illustrated in FIG. 5. (In fact, the closure is brought about in a given angular range of approximately from 15° to 20° at each side of the position for alignment of the axes, the end surface 64 of the profile-member being greater than the cross-section of the conduit at the lip 68).

Although the provision of lips 66 and 68 has been described, they are merely optional, or a single lip is sufficient. They can also have other locations, that is to say, on the profile-member or on the conduit.

Figure 1:
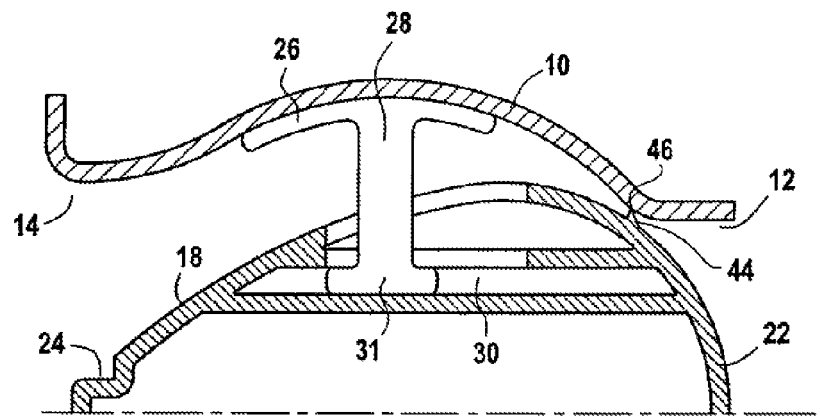
Figure 2:
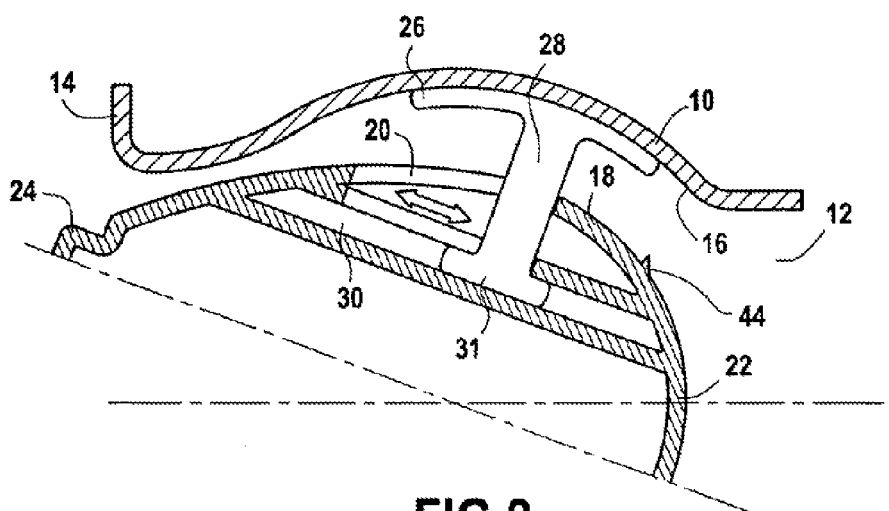

Although there has been described a profile-member 60 whose movement in translation is brought about by sliding in a collar 58 of a cylindrical portion of the profile-member, any other configuration may be envisaged, in particular as illustrated in FIGS. 1 and 2.

In all the embodiments, the travel limiting member, whether it serves to guide or not, must be located inside the circle delimited by the contact of the profile-member 60 with the rear conduit portion.

When the travel limiting member is formed by projections which prevent translation, it is advantageous for those projections to be in the form of fins so that they produce the smallest possible loss of charge in the air flow for ventilation. However, when the limiting member brings about guiding, it may have a profiled shape which continues that of the profile-member 60. However, it is advantageous for it also to produce as small a charge loss as possible, particularly when the profile-member is in a highly inclined position for the air flow, as indicated in FIG. 6.

Naturally, the air vent according to the invention may comprise various improvements, in particular such as those described in the above-mentioned document FR-2 886 384.

In the embodiments of FIGS. 4 to 6, the fins 54 which are fixedly joined to the ring 52 bring about effective guiding of the profile-member when it is orientated in terms of rotation in all directions in the chamber of the conduit 50. Although this arrangement has the advantage of allowing a reduction in the surface-area of the ring 52 which is in contact with the chamber, the arrangements illustrated in the above-mentioned document, in particular concerning a device for fixing the ring in position, may be used according to the invention.

The invention claimed is:

1. An air vent having adjustment of the orientation and flow rate of an air flow, comprising:

a conduit (50) for the air flow having, between an inlet and an outlet delimiting a flow direction, at least one chamber, at least a portion of the inner surface of which forms a spherical segment, a profile-member (60), at least the majority of which is provided in the chamber of the conduit so that the flow of air moves in the chamber around the profile-member, the profile-member (60) having a holding device (62) which is provided at the side of the outlet, and a ring (52) which has an outer surface forming a sphere portion having practically the same radius as the spherical segment of the chamber with which the ring cooperates, the ring (52) being provided in the chamber and supporting the profile-member (60) in the conduit (50), allowing movement of the profile-member (60) in rotation relative to the conduit (50) and in translation relative to the ring (52) along an axis of translation, the profile-member (60) being able, in a translational movement relative to the ring (52), to take up a closure position in which the profile-member is in contact with and blocks the conduit, wherein the profile-member (60) is provided with a travel limiting member (70, 72) protruding from a rear surface of the profile-member (60) which limits the travel of the profile-member (60) in terms of translation relative to the ring (52) when the axis of translation of the profile-member (60) relative to the ring (52) is inclined relative to the flow direction, wherein the travel limiting member (70, 72) cooperates with the spherical segment of the conduit to limit the travel of the profile-member (60) in terms of translation relative to the ring (52), and wherein the travel limiting member (70, 72) limits the travel of the profile-member (60) in terms of translation relative to the ring (52) only when the axis of translation of the profile-member (60) is inclined relative to the ring (52).

2. The air vent according to claim 1, wherein the profile-member (60) has a circular portion (64) which is centered relative to the axis of translation and which forms a surface for blocking the conduit (50).

3. The air vent according to claim 1, wherein the ring (52) has at least one arm (56) which projects towards the inner side of the ring (52) and which is intended to support the profile-member (60) whilst allowing the profile-member (60) to move in translation.

4. The air vent according to claim 1, wherein the profile-member (60) has at least one groove (30), in which a portion (31) of the arm is intended to slide in a direction having at least one component in the translation direction.

5. The air vent according to claim 1, wherein the profile-member (60) has a cylindrical portion which slides in a collar (58) which is fixedly joined to the arms (56) of the ring (52).

6. The air vent according to claim 1, wherein the travel limiting member comprises a plurality of projections (70), each having a cross-section of small width in a plane which is perpendicular relative to the axis of translation.

7. The air vent according to claim 6, wherein each projection (70) is in the form of a fin which is contained in a plane which contains the axis of translation of the profile-member (60).

8. The air vent according to claim 1, wherein the limiting member (72) further constitutes a guiding member which, owing to contact with the wall of the conduit (50), tends to bring about alignment of the axis of translation with the flow direction when the blocking surface (64) moves towards the position for contact with the conduit (50).

9. The air vent according to claim 8, wherein the limiting and guiding member (72) comprises a projection which tapers in accordance with the axis of translation and which is provided substantially at the centre of the blocking surface (64).

10. The air vent according to claim 2, wherein the ring (52) has at least one arm (56) which projects towards the inner side of the ring (52) and which is intended to support the profile-member (60) whilst allowing the profile-member (60) to move in translation.

11. The air vent according to claim 2, wherein the profile-member (60) has at least one groove (30), in which a portion (31) of the arm is intended to slide in a direction having at least one component in the translation direction.

12. The air vent according to claim 3, wherein the profile-member (60) has at least one groove (30), in which a portion (31) of the arm is intended to slide in a direction having at least one component in the translation direction.

13. The air vent according to claim 2, wherein the profile-member (60) has a cylindrical portion which slides in a collar (58) which is fixedly joined to the arms (56) of the ring (52).

14. The air vent according to claim 3, wherein the profile-member (60) has a cylindrical portion which slides in a collar (58) which is fixedly joined to the arms (56) of the ring (52).

15. An air vent having adjustment of the orientation and flow rate of an air flow, comprising:

a conduit (50) for the air flow having, between an inlet and an outlet delimiting a flow direction, at least one chamber, at least a portion of the inner surface of which forms a spherical segment, a profile-member (60), at least the majority of which is provided in the chamber of the conduit so that the flow of air moves in the chamber around the profile-member, the profile-member (60) having a holding device (62) which is provided at the side of the outlet, and a ring (52) which has an outer surface forming a sphere portion having practically the same radius as the spherical segment of the chamber with which the ring cooperates, the ring (52) being provided in the chamber and supporting the profile-member (60) in the conduit (50), allowing movement of the profile-member (60) in rotation relative to the conduit (50) and in translation relative to the ring (52) along an axis of translation, the profile-member (60) being able, in a translational movement relative to the ring (52), to take up a closure position in which the profile-member is in contact with and blocks the conduit, wherein the profile-member (60) is provided with a travel limiting member (70, 72) which limits the travel of the profile-member (60) in terms of translation relative to the ring (52) when the axis of translation of the profile-member (60) relative to the ring (52) is inclined relative to the flow direction by contacting the spherical segment of the conduit (50), wherein the profile-member (60) has a rear surface (64) that blocks the conduit (50), the travel limiting member (70, 72) being located on and protruding rearwardly from said rear surface (64), and wherein the travel limiting member (70, 72) limits the travel of the profile-member (60) in terms of translation relative to the ring (52) only when the axis of translation of the profile-member (60) is inclined relative to the ring (52).

16. The air vent according to claim 1, wherein the travel limiting member (70, 72) abuts against the conduit for limiting the travel of the profile-member (60) in terms of translation relative to the ring (52).

* * * * *